United States Patent Office 3,445,234
Patented May 20, 1969

3,445,234
LEUCO DYE/HEXAARYLBIIMIDAZOLE IMAGE-FORMING COMPOSITION
Lawrence Anthony Cescon and Rolf Dessauer, Wilmington, Del., assignors to E. I. du Pont de Nemours and Company, Wilmington, Del., a corporation of Delaware
No Drawing. Continuation-in-part of applications Ser. No. 426,421, Jan. 18, 1965, and Ser. No. 234,538, Oct. 31, 1962. This application May 13, 1968, Ser. No. 728,781
Int. Cl. G03c 1/00, 1/72
U.S. Cl. 96—90       20 Claims

ABSTRACT OF THE DISCLOSURE

An image-forming composition of (1) a dye in its leuco form, and (2) a 2,2',4,4',5,5'-hexaarylbiimidazole. The composition can be combined with a binder and coated upon a substrate from a solvent solution. A representative composition is tris(4-diethylamino-o-tolyl)-methane trihydrochloride and 2,2'-bis(o-chlorophenyl)-4,4',5,5'-tetraphenyl biimidazole.

CROSS REFERENCES TO RELATED APPLICATIONS

This application is a continuation-in-part of application Ser. No. 426,421 filed Jan. 18, 1965 now abandoned which is a continuation of application Ser. No. 234,538, filed Oct. 31, 1962, and now abandoned.

BACKGROUND OF THE INVENTION

Field of the invention

This invention is directed to novel light-sensitive compositions and to a unique process for forming a colored material from an essentially colorless one by irradiation with ultraviolet light. More particularly, the present invention is directed to a composition comprising intimate admixtures of the leuco form of dyes and the dimers of a selected 2,4,5-triarylimidazolyl radical, which composition quickly undergoes a color change to form a clear image upon irradiation with pattern of ultraviolet light.

Description of the prior art

Image-forming compositions and processes play an essential part in photography, thermography and related arts dealing with processes of writing, printing, and producing images with the aid of light, heat, electricity, or combinations of these activating influences. Currently available methods of image production impose numerous limitations which are costly, inconvenient, time consuming, and sometimes potentially hazardous. For example, classical photography, although efficient in the utilization of light energy, employs expensive chemicals and papers, involves multi-step processing and drying, and requires a highly skilled operator for consistently good results.

Thermography requires less operator skill and less expensive papers but produces images of poor quality which are easily destroyed. Mechanical printing, while inexpensive and rapid for repetitive printing, is decidedly more expensive and slow for sequential printing. In both cases, mechanical printing yields a wet image. Presently available photochemical image-forming systems involve the use of toxic chemicals such as ammonia, cyanide derivatives, halocarbon, caustic materials. A new printing or imaging system which would overcome even some of the limitations of the currently available methods would significantly advance the art and be desirable.

It is, therefore, an object of this invention to provide a new and novel composition sensitive to ultraviolet light and capable of forming permanent images when irradiated. Another object is to provide an activator for a dye in a reduced, colorless state so that the composition responds rapidly to radiation by ultraviolet light to produce colored images with high resolution. A still further object is to provide a novel process for forming a permanent colored image. These and other objects will become apparent in the following description and claims.

SUMMARY OF THE INVENTION

The compositions of this invention comprise (1) at least one leuco dye having one or two removable hydrogen atoms the removal of which forms a differently colored compound, with the proviso that when the leuco has only one removable hydrogen and the resultant dye is cationic there is also present an acid which forms a salt of the leuco dye, and (2) a 2,2',4,4',5,5'-hexaarylbiimidazole wherein said aryl groups each have up to 26 carbon atoms, said biimidazole being dissociated into free radicals when irradiated with ultraviolet light, and said composition being sensitive to light with a wave length from about 2000 A. to about 4200 A. Optionally, the composition can also contain an inert solvent and an inert, transparent binder.

The composition is a light-sensitive composition that can be coated on a supporting base, such as paper or film, for use in photosensitive color-forming applications.

DESCRIPTION OF THE INVENTION

(A) The leuco dye

The leuco form of a dye which comprises one component of the light-sensitive compositions of the present invention is the reduced form of the dye having one or two hydrogen atoms, the removal of which together with an additional electron in certain cases produces the dye. Since the leuco form of the dye is essentially colorless, or in some instances it may be of a different color or of a less intense shade than the parent dye, it provides a means of producing an image when the leuco form is oxidized to the dye. This oxidation is accomplished in the invention by having present in intimate admixture with the leuco form of the dye a dimer of a 2,4,5-triarylimidazolyl radical. The dimer of the imidazolyl radical is activated by light in the ultraviolet range of wave length from about 2000 A. to about 4200 A., and when irradiated with light within this range it splits into free imidazolyl radicals. These free radicals react with the leuco form of the dye to produce a colored image against a background of unirradiated and, therefore, unchanged material.

A large number of dyes in the leuco form have been found to be readily converted to the parent dye by free 2,4,5-triarylimidazolyl radicals by the above-described mechanism and are well adapted to provide new and useful image forming compositions. Dyes in the leuco form which are operative according to the invention include
(a) aminotriarylmethanes
(b) aminoxanthenes
(c) aminothioxanthenes
(d) amino-9,10-dihydroacridines
(e) aminophenoxazines
(f) aminophenothiazines
(g) aminodihydrophenazines
(h) aminodiphenylmethanes
(i) leuco indamines
(j) aminohydrocinnamic acids (cyanoethanes, leuco methines)
(k) hydrazines
(l) leuco indigoid dyes
(m) amino-2,3-dihydroanthraquinones
(n) tetrahalo-p,p'-biphenols
(o) 2(p-hydroxyphenyl)-4,5-diphenylimidazoles
(p) phenethylanilines Of these leuco forms, (a) through (i) form the dye by losing one hydrogen atom, while the leuco forms (j) through (p) lose two hydrogen atoms to produce the parent dye.

The preferred leuco dyes are the aminotriarylmethanes. A general preferred aminotriarylmethane class is the acid salts of aminotriarylmethanes wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, or benzyl and (b) a group ortho to the methane carbon atom which is selected from lower alkyl, lower alkoxy, fluorine, chlorine or bromine; and the third aryl group may be the same as or different from the first two, and when different is selected from (a) Phenyl which can be substituted with lower alkyl, lower alkoxy, chloro, diphenylamino, cyano, nitro, hydroxy, fluoro or bromo;

(b) Naphthyl which can be substituted with amino, di-lower alkylamino, alkylamino;

(c) Pyridyl which can be substituted with alkyl;

(d) Quinolyl;

(e) Indolinylidene which can be substituted with alkyl. Preferably, $R_1$ and $R_2$ are hydrogen or alkyl of 1–4 carbon atoms. Most preferably all three aryl groups are the same.

The triarylmethanes of the structure of the preceding paragraph do not undergo a color-forming reaction under ordinary darkroom storage conditions and are therefore preferred. Other aminotriarylmethanes employed in the compositions of this invention do undergo a color-forming dark reaction which leads to fogging or coloration of photographic films, papers or other systems containing the light-sensitive compositions of this invention. However, such aminotriarylmethanes are operable in the novel compositions, for the color-forming dark reaction can be prevented by storing such compositions in the absence of air.

Representative leuco dyes covered by the classes (a) through (p) set forth above include:

(a) Aminotriarylmethanes
bis(4-amino-2-butylphenyl) (p-dimethylaminophenyl) methane
bis(4-amino-2-chlorophenyl) (p-aminophenyl)methane
bis(4-amino-3-chlorophenyl) (o-chlorophenyl)methane
bis(4-amino-3-chlorophenyl)phenylmethane
bis(4-amino-3,5-diethylphenyl) (o-chlorophenyl)methane
bis(4-amino-3,5-diethylphenyl) (o-ethoxyphenyl)methane
bis(4-amino-3,5-diethylphenyl) (p-methoxyphenyl) methane
bis(4-amino-3,5-diethylphenyl)phenylmethane
bis(4-amino-3-ethylphenyl) (o-chlorophenyl)methane
bis(p-aminophenyl) (4-amino-m-tolyl)methane
bis(p-aminophenyl) (o-chlorophenyl)methane
bis(p-aminophenyl) (p-chlorophenyl)methane
bis(p-aminophenyl) (2,4-dichlorophenyl)methane
bis(p-aminophenyl) (2,5-dichlorophenyl)methane
bis(p-aminophenyl) (2,6-dichlorophenyl)methane
bis(p-aminophenyl)phenylmethane
bis(4-amino-o-tolyl) (p-chlorophenyl)methane
bis(4-amino-o-tolyl) (2,4-dichlorophenyl)methane
bis(p-anilinophenyl) (4-amino-m-tolyl)methane
bis(4-benzylamino-2-cyanophenyl) (p-aminophenyl) methane
bis(p-benzylethylaminophenyl) (p-chlorophenyl)methane
bis(p-benzylethylaminophenyl) (p-diethylaminophenyl) methane
bis(p-benzylethylaminophenyl) (p-dimethylaminophenyl) methane
bis(4-benzylethylamino-o-tolyl) (p-methoxyphenyl) methane
bis(p-benzylethylaminophenyl)-phenylmethane
bis(4-benzylethylamino-o-tolyl) (o-chlorophenyl) methane
bis(4-benzylethylamino-o-tolyl) (p-diethylaminophenyl) methane
bis(4-benzylethylamino-o-tolyl) (4-diethylamino-o-tolyl) methane
bis(4-benzylethylamino-o-tolyl) (p-dimethylaminophenyl) methane
bis[2-chloro-4-(2-diethylaminoethyl)ethylaminophenyl] (o-chloro-phenyl)methane
bis[p-bis(2-cyanoethyl)aminophenyl]phenylmethane
bis[p-(2-cyanoethyl)ethylamino-o-tolyl] (p-dimethylaminophenyl)methane
bis[p-(2-cyanoethyl)methylaminophenyl] (p-diethylaminophenyl)methane
bis(p-dibutylaminophenyl) [p-(2-cyanoethyl)methylaminophenyl]methane
bis(p-dibutylaminophenyl) (p-diethylaminophenyl) methane
bis(4-diethylamino-2-butoxyphenyl) (p-diethylaminophenyl)methane
bis(4-diethylamino-2-fluorophenyl)o-tolylmethane
bis(p-diethylamino) (p-aminophenyl)methane
bis(p-diethylaminophenyl) (4-anilino-1-naphthyl) methane
bis(p-diethylaminophenyl) (m-butoxyphenyl)methane
bis(p-diethylaminophenyl) (o-chlorophenyl)methane
bis(p-diethylaminophenyl) (p-cyanophenyl)methane
bis(p-diethylaminophenyl) (2,4-dichlorophenyl)methane
bis(p-diethylaminophenyl) (4-diethylamino-1-naphthyl) methane
bis(p-diethylaminophenyl) (p-dimethylaminophenyl) methane
bis(p-diethylaminophenyl) (4-ethylamino-1-naphthyl) methane
bis(p-diethylaminophenyl)2-naphthylmethane
bis(p-diethylaminophenyl) (p-nitrophenyl)methane
bis(p-diethylaminophenyl)2-pyridylmethane
bis(p-diethylamino-m-tolyl) (p-diethylaminophenyl) methane
bis(4-diethylamino-o-tolyl) (o-chlorophenyl)methane
bis(4-diethylamino-o-tolyl) (p-diethylaminophenyl) methane
bis(4-diethylamino-o-tolyl) (p-diphenylaminophenyl) methane
bis(4-diethylamino-o-tolyl)phenylmethane
bis(4-dimethylamino-2-bromophenyl)phenylmethane
bis(p-dimethylaminophenyl) (4-anilino-1-naphthyl) methane
bis(p-dimethylaminophenyl) (p-butylaminophenyl) methane
bis(p-dimethylaminophenyl) (p-sec. butylethylaminophenyl)methane
bis(p-dimethylaminophenyl) (p-chlorophenyl)methane
bis(p-dimethylaminophenyl) (p-diethylaminophenyl) methane
bis(p-dimethylaminophenyl) (4-dimethylamino-1-naphthyl)methane
bis(p-dimethylaminophenyl) (6-dimethylamino-m-tolyl) methane
bis(p-dimethylaminophenyl) (4-dimethylamino-o-tolyl) methane
bis(p-dimethylaminophenyl) (4-ethylamino-1-naphthyl) methane
bis(p-dimethylaminophenyl) (p-hexyloxyphenyl)methane
bis(p-dimethylaminophenyl) (p-methoxyphenyl)methane
bis(p-dimethylaminophenyl) (5-methyl-2-pyridyl) methane
bis(p-dimethylaminophenyl) 2-quinolymethane
bis(p-dimethylaminophenyl) o-tolylmethane
bis(p-dimethylaminophenyl) (1,3,3-trimethyl-2-indolinylidenemethyl)methane
bis(4-dimethylamino-o-tolyl) (p-aminophenyl)methane
bis(4-dimethylamino-o-tolyl) (o-bromophenyl)methane
bis(4-dimethylamino-o-tolyl) (o-cyanophenyl)methane
bis(4-dimethylamino-o-tolyl) (o-fluorophenyl)methane
bis(4-dimethylamino-o-tolyl) 1-naphthylmethane bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl)
 methane
bis(4-ethylamino-m-tolyl)(p-hydroxyphenyl)methane
bis[4-ethyl(2-hydroxyethyl)amino-m-tolyl](p-diethyl-
 aminophenyl)methane
bis[p-(2-hydroxyethyl)aminophenyl](o-chlorophenyl)
 methane
bis[p-(bis(2-hydroxyethyl)aminophenyl](4-diethylamino-
 o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane
bis(2-butoxy-4-diethylaminophenyl)phenylmethane
bis(4-diethylamino-o-tolyl)(p-methoxyphenyl)methane
bis(4-diethylamino-2-methoxyphenyl)(p-nitrophenyl)
 methane
bis(4-diethylamino-1-naphthyl)(4-diethylamino-o-tolyl)
 methane
bis(4-diethylamino-o-tolyl)1-naphthylmethane
bis(4-diethylamino-o-tolyl)phenylmethane
tris(4-dimethylamino-2-chlorophenyl)methane
bis(4-dimethylamino-2,5-dimethylphenyl)phenylmethane
bis(4-dimethylamino-o-tolyl)(o-bromophenyl)methane
bis(4-ethylbenzylamino-o-tolyl)(p-methoxyphenyl)
 methane
tris(p-dioctylamino-o-tolyl)methane
bis(4-diethylamino-o-tolyl)-4-methoxy-1-naphthyl
 methane
bis(4-diethylamino-o-tolyl)-3,4,5-trimethoxyphenyl
 methane
bis(4-diethylamino-o-tolyl)-p-hydroxyphenyl methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl
 sulfone
4-[bis(4-diethylamino-o-tolyl)-methyl]-methyl-
 sulfonanilide
4-[bis(4-diethylamino-o-tolyl)-methyl]-p-tolyl-
 sulfonanilide
bis(4-diethylamino-o-tolyl)-p-nitrophenyl methane
bis(4-diethylamino-o-tolyl)(2-diethylamino-4-methyl-
 5-thiazolyl) methane
bis(4-diethylamino-o-tolyl)(2-diethylamino-5-methyl-
 6-benzoxazolyl) methane
bis(4-diethylamino-o-tolyl)(2-diethylamino-5-methyl-
 6-benzothiazolyl) methane
bis(4-diethylamino-o-tolyl)(1-ethyl-2-methyl-3-indolyl)
 methane bis(4-diethylamino-o-tolyl)(1-benzyl-2-methyl-3-
 indolyl) methane
bis(4-diethylamino-o-tolyl)(1-ethyl-2-methyl-5-
 methoxyl-3-indolyl) methane
bis(1-o-xylyl-2-methyl-3-indolyl)(4-diethylamino-o-
 tolyl)methane
bis(4-diethylamino-o-tolyl)(1-ethyl-5-indolinyl)methane
bis(1-isobutyl-6-methyl-5-indolinyl)(4-diethylamino-o-
 tolyl)methane
bis(4-diethylamino-o-tolyl)(8-methyl-9-julolindinyl)-
 methane
bis(4-diethylamino-2-acetamidophenyl)(4-diethylamino-
 o-tolyl)methane
4-[bis(4-diethylamino-o-tolyl)methyl]-N-ethylacetanilide
bis[4-(1-phenyl-2,3-dimethyl-5-pyrazolinyl)](4-diethyla-
 mino-o-tolyl)methane
bis(4-diethylamino-o-tolyl)(7-diethylamino-4-methyl-3-
 coumarinyl)methane
bis(4-diethylamino-o-tolyl)(4-acrylamidophenyl)-
 methane
bis(4-diethylamino-o-tolyl)(p-benzylthiophenyl)methane
bis(4-diethylamino-o-tolyl)(4-isopropylthio-3-methyl-
 phenyl)methane
bis(4-diethylamino-o-tolyl)(4-chlorobenzylthiophenyl)-
 methane
bis(4-diethylamino-o-tolyl)(2-furyl)methane
bis(4-diethylamino-o-tolyl)(3,4-methylenedioxyphenyl)
 methane
bis(4-diethylamino-o-tolyl)(3,4-dimethoxyphenyl)
 methane
bis(4-diethylamino-o-tolyl)(3-methyl-2-thienyl)methane
bis(4-diethylamino-o-tolyl)(2,4-dimethoxyphenyl)
 methane In addition to the aminotriarylmethanes listed above the leuco forms of the triphenylmethane dyes identified by the following Colour Index numbers may be used, 42000B, 42005, 42010, 42025, 42030, 42036, 42035, 42040, 42500, 42505, 42510B, 42515, 42520, 42555B, 42556, 42563B, 42600, 42605, 42705, 42760, 42785, 43500.

(b) Aminoxanthenes 3-amino-6-dimethylamino-2-methyl-9-(o-chlorophenyl)
 xanthene
3-amino-6-dimethylamino-2-methyl-9-phenylxanthene
3-amino-6-dimethylamino-2-methylxanthene
3,6-bis(diethylamino)-9-(o-chlorophenyl)xanthene
3,6-bis(diethylamino)-9-hexylxanthene
3,6-bis(diethylamino)-9-(o-methoxycarbonylphenyl)
 xanthene
3,6-bis(diethylamino)-9-methylxanthene
3,6-bis(diethylamino)-9-phenylxanthene
3,6-bis(diethylamino)-9-o-tolylxanthene
3,6-bis(dimethylamino)-9(o-chlorophenyl)xanthene
3,6-bis(dimethylamino)-9-ethylxanthene
3,6-bis(dimethylamino)-9-(o-methoxycarbonylphenyl)
 xanthene
3,6-bis(dimethylamino)-9-methylxanthene.

In addition to the above-listed aminoxanthenes the leuco forms of the xanthene dyes identified by the following Colour Index numbers may be used, 45000, 45005, 45010, 45015, 45050, 45070, 45090, 45095, 45100, 45105, 45150.

(c) Aminothioxanthenes 3,6-bis(diethylamino)-9-(o-ethoxycarbonylphenyl)
 thioxanthene
3,6-bis(dimethylamino)-9-(o-methoxycarbonylphenyl)
 thioxanthene
3,6-bis(dimethylamino)thioxanthene
3,6-dianilino-9-(o-ethoxycarbonylphenyl)thioxanthene (d) Amino-9,10-dihydroacridines 3,6-bis(benzylamino)-9,10-dihydro-9-methylacridine
3,6-bis(diethylamino)-9-hexyl-9,10-dihydroacridine
3,6-bis(diethylamino)-9,10-dihydro-9-methylacridine 3,6-bis(diethylamino)-9,10-dihydro-9-phenylacridine
3,6-diamino-9-hexyl-9,10-dihydroacridine
3,6-diamino-9,10-dihydro-9-methylacridine
3,6-diamino-9,10-dihydro-9-phenylacridine
3,6-bis(dimethylamino)-9-hexyl-9,10-dihydroacridine
3,6-bis(dimethylamino)-9,10-dihydro-9-methylacridine.

Also included are the leuco forms of the acridine dyes having CI numbers 46000, 46005B, 46010, 46015, 46020, 46025, 46030, 46035, 46040, 46055, 46060, 46065, 46070, 46075, 46080.

(e) Aminophenoxazines 3,7-bis(diethylamino)phenoxazine
9-dimethylamino-benzo[a]phenoxazine and the leuco forms of phenoxazine dyes having CI numbers 51000, 51180, 51185, 51190, 51195.

(f) Aminophenothiazines 3,7-bis(benzylamino)phenothiazine and the leuco form of phenothiazine dyes having CI numbers 52000, 52010, 52015, 52020, 52025, 52030, 52035, 52050.

(g) Aminodihydrophenazines 3,7-bis(benzylethylamino)-5,1-dihydro-5-phenylphenazine
3,7-bis(diethylamino)-5-hexyl-5,10-dihydrophenazine
3,7-bis(dihexylamino)-5,10-dihydrophenazine
3,7-bis(dimethylamino)-5-(p-chlorophenyl)-5,10-dihydrophenazine
3,7-diamino-5-(o-chlorophenyl)-5,10-dihydrophenazine
3,7-diamino-5,10-dihydrophenazine
3,7-diamino-5,10-dihydro-5-methylphenazine
3,7-diamino-5-hexyl-5,10-dihydrophenazine
3,7-bis(dimethylamino)-5,10-dihydrophenazine
3,7-bis(dimethylamino)-5,10-dihydro-5-phenylphenazine
3,7-bis(dimethylamino)-5,10-dihydro-5-methylphenazine Also included are the leuco forms of the phenazine dyes having CI numbers 50035, 50040, 50045, 50200, 50205, 50206, 50210, 50216, 50220, 50225, 50235, 50240.

(h) Aminodiphenylmethanes 1,4-bis[bis-p(diethylaminophenyl)methyl]piperazine
bis(p-diethylaminophenyl)anilinomethane
bis(p-diethylaminophenyl)-1-benzotriazolylmethane
bis(p-diethylaminophenyl)-2-benzotriazolylmethane
bis(p-diethylaminophenyl)(p-chloroanilino)methane
bis(p-diethylaminophenyl)(2,4-dichloroanilino)methane
bis(p-diethylaminophenyl)(methylamino)methane
bis(p-diethylaminophenyl)(octadecylamino)methane
bis(p-dimethylaminophenyl)aminomethane
bis(p-dimethylaminophenyl)anilinomethane
1,1-bis(dimethylaminophenyl)ethane
1,1-bis(dimethylaminophenyl)heptane
bis(4-methylamino-m-tolyl)aminoethane.

(i) Leuco indamines 4-amino-4'-dimethylaminodiphenylamine
p-(p-dimethylaminoanilino)phenol and the leuco forms of indamine and indophenol dyes having CI numbers 49400, 49405, 49410, 49700.

(j) Aminohydrocinnamic acids (cyanoethanes, leuco methines)

4-amino-α,β-dicyanohydrocinnamic acid, methyl ester
4-anilino-α,β-dicyanohydrocinnamic acid, methyl ester
4-(p-chloroanilino)-α,β-dicyanohydrocinnamic acid, methyl ester
α-cyano-4-dimethylaminohydrocinnamamide
α-cyano-4-dimethylaminohydrocinnamic acid, methyl ester
α,β-dicyano-4-diethylaminohydrocinnamic acid, methyl ester
α,β-dicyano-4-dimethylaminohydrocinnamamide
α,β-dicyano-4-dimethylaminohydrocinnamic acid, methyl ester
α,β-dicyano-4-dimethylaminohydrocinnamic acid
α,β-dicyano-4-dimethylaminohydrocinnamic acid, hexyl ester
α,β-dicyano-4-ethylaminohydrocinnamic acid, methyl ester
α,β-dicyano-4-hexylaminohydrocinnamic acid, methyl ester
α,β-dicyano-4-methylaminocinnamic acid, methyl ester
p-(2,2-dicyanoethyl)-N,N-dimethylaniline
4-methoxy-4'-(1,2,2-tricyanoethyl)azobenzene
4-(1,2,2-tricyanoethyl)azobenzene
p-(1,2,2-tricyanoethyl)-N,N-dimethylaniline and substituted hydrocinnamic acids which are the leuco forms of dyes having CI numbers 48000, 48001, and 48005.

(k) Hydrazines 1-(p-diethylaminophenyl)-2-(2-pyridyl)hydrazine
1-(p-dimethylaminophenyl)-2-(2-pyridyl)hydrazine
1-(3-methyl-2-benzothiazolyl)-2-(4-hydroxy-1-naphthyl)hydrazine
1-(2-naphthyl)-2-phenylhydrazine
1-p-nitrophenyl-2-phenylhydrazine
1-(1,3,3-trimethyl-2-indolinyl)-2-(3-N-phenylcarbamoyl-4-hydroxy-1-naphthyl)hydrazine (l) Leuco indigoid dyes The leuco forms of indigoid dyes having CI numbers 73000, 73015, 73025, 73030, 73035, 73040, 73045, 73050, 73055, 73060, 73065, 73070, 73085, 73090, 73110, 73300, 73305, 73310, 73315, 73320, 73325, 73335, 73340, 73345, 73350, 73360.

(m) Amino-2,3-dihydroanthraquinones 1,4-dianilino-2,3-dihydroanthraquinone
1,4-bis(ethylamino)-2,3-dihydroanthraquinone and leuco forms of dyes bearing CI numbers 61100, 61105, 61107, 61116, 61120, 61140, 61500, 61505, 61510, 61515, 61520, 61525, 61530, 61535, 61540, 61545, 61565, 61650.

(p) Phenethylanilines

N-(2-cyanoethyl)-p-phenethylaniline
N,N-diethyl-p-phenylethylaniline
N,N-dimethyl-p-[2-(1-naphthyl)ethyl]aniline
N,N-dimethyl-p-[2-(4-nitro-1-naphthyl)ethyl]aniline
N,N-dimethyl-p-phenethylaniline
N,N-dimethyl-p-[2-(4-methoxy-1-naphthyl)ethyl]aniline
p-(p-methoxyphenethyl)aniline
p-[2-(1-naphthyl)ethyl]aniline
p-(p-nitrophenethyl)aniline
p-phenethylaniline (B) The hexaarylbiimidazole The hexaarylbiimidazoles are 2,4,5-triaryl-imidazolyl dimers that are dissociable to the corresponding triarylimidazolyl radicals wherein the aryl groups may be the same or different, carbocyclic or heterocyclic, substituent free or bearing substituents that do not interfere with the dissociation step and the subsequent oxidation of the oxidizable substrate.

The hexaarylbiimidazoles can be represented as the dimers of 2,4,5-triarylimidazolyls of the formula

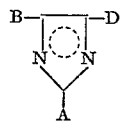

wherein A, B, and D are aryl radicals, as previously defined.

The hexaarylbiimidazoles can also be represented by the formula

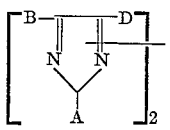

wherein A, B and D stand for aryl radicals described above. Upon dissociation, the dimer forms the corresponding 2,4,5-triarylimidazolyl radical. The B and D groups can normally carry 0–3 substituents, the A group 0–4 substituents.

The aryl groups include one- and two-ring aryls, such as phenyl, biphenyl, naphthyl, pyridyl, furyl and thienyl. Suitable inert substituents on the aryl groups have Hammett sigma (para) values in the −.5 to 0.8 range and are other than hydroxyl, sulfhydryl, amino, alkylamino or dialkylamino. Preferably, these inert substituents are free of Zerewitinoff hydrogen, i.e., have no hydrogens reactive towards methyl magnesium iodide. Representative substituents and their sigma values, (relative to H = .00), as given by Jaffe, Chem., Rev. 53, 219–233 (1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents may be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkylsulfonyl, arylsulfonyl, and nitro, and lower alkylcarbonyl. In the foregoing list, alkyl groups referred to there are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range −.4 to +.4, particularly lower alkyl, lower alkoxy, chloro, fluoro, bromo and benzo groups.

In a preferred biimidazole class, the 2 and 2′ aryl groups are phenyl rings bearing an ortho substituent having a Hammett sigma value in the range −.4 to +.4. Preferred ortho substituents are fluorine, chlorine, bromine, methyl and methoxy groups; especially chloro. Such dimers tend less than other dimers to form color when the light-sensitive compositions are applied to and dried on substrates at somewhat elevated temperatures, e.g. in the range 70–100° C.

Most preferably, the 2-phenyl ring carries only the above-described ortho group, and the 4- and 5-phenyl rings are either unsubstituted or substituted with lower alkoxy.

Representative dimers of the imidazolyl radicals other than those given in the examples which fall within the scope of the invention are listed below, in terms of the substituents of the aryl groups when aryl is phenyl and in terms of other aryl groups than phenyl, by way of illustrating the activatable imidazolyl dimers which may be employed in the composition.

I. PHENYL SUBSTITUTED IMIDAZOLYL RADICALS

| Substituents of phenyl rings attached at— | | |
|---|---|---|
| 2-Position | 4-Position | 5-Position |
| o-acetoxy | | |
| o-benzyl | | |
| o-benzylthio | o-benzylthio | o-benzylthio. |
| p-[4,5-bis(p-methoxyphenyl)-2-imidazolyl] | | |
| o-bromo | p-bromo | |
| Do | o-methoxy | o-methoxy. |
| 2-bromo-4-phenyl | | |
| o-n-butoxy | | |
| N-butylacetamido | | |
| o-butylthio | | |
| p-t-butylthio | | |
| o-butyryloxy | | |
| o-chloro | | |
| Do | o-chloro | o-chloro. |
| Do | p-chloro | |
| Do | do | p-chloro. |
| Do | 3,4-dichloro | |
| Do | p-methoxy | |
| Do | m-pentyloxy | |
| Do | do | m-pentyloxy. |
| Do | m-methoxy | m-methoxy. |
| Do | p-propionyloxy | |
| 2-chloro-4-phenyl | | |
| 2-chloro-4-methoxy | | |
| p-chloro | p-chloro | p-chloro. |
| o-cyano | | |
| Do | p-t-butyl | |
| Do | do | p-t-butyl. |
| Do | p-cyano | p-cyano. |
| Do | p-methoxy | p-methoxy. |
| 2,3-dibromo | | |
| 2,4-dibromo | | |
| 2,6-dibutyl | | |
| o-dibutylsulfamoyl | | |
| 2,4-dichloro | o-bromo | |
| 2,6-dichloro | | |
| Do | p-butoxy | p-butoxy. |
| 3,4-dichloro | 2,4-dimethoxy | |
| 2,4-dicyano | p-cyano | p-cyano. |
| 2,6-dicyano | | |
| 3,5-dicyano-4-methoxy | | |
| p-(2,2-dicyanovinyl) | | |
| 2,4-diethoxy | | |
| o-diethylsulfamoyl | | |
| 2,5-difluoro | p-cyano | |
| Do | do | p-cyano. |
| 2,3-dimethoxy | | |
| 2,4-dimethoxy | o-chloro | |
| Do | do | o-chloro. |
| Do | 2,4-dimethoxy | |
| Do | do | 2,4-dimethoxy. |
| Do | o-methoxy | |
| Do | p-methoxy | |
| Do | do | p-methoxy. |
| Do | m-phenylthio | |
| Do | do | m-phenylthio. |
| 3,4-dimethoxy | o-cyano | |
| Do | 2,4-dipentyl | 2,4-dipentyl. |
| 2,4-dimethoxy | | |
| o-dimethylcarbamoyl | | |
| 2,4-dipentyl | 2,4-dipentyl | 2,4-dipentyl. |
| p-(4,5-diphenyl-2-imidazolyl) | | |
| p-[4-(4,5-diphenyl-2-imidazolyl)phenyl] | | |
| 2,4-dipropoxy | | |
| 2,4-dinaphthylthio | | |
| 2-nitro | m-methoxy | m-methoxy. |
| 2-nitro-5-methoxy | | |
| 2,4-dipropoxy | o-diethylcarbamoyl | |
| o-dipropylcarbamoyl | | |
| p-ethoxy | | |
| Do | p-diethylsulfamoyl | |
| o-ethoxycarbonyl | | |
| o-ethyl | | |
| o-N-ethylbutyramido | | |
| o-ethylthio | | |
| o-N-ethylvaleramido | p-t-pentyl | p-t-pentyl. |
| o-fluoro | o-methoxy | o-methoxy. |
| p-hexyloxy | p-methoxycarbonyl | p-methoxycarbonyl. |
| o-methoxy | | |
| Do | p-chloro | |
| Do | o-methylthio | o-methylthio. |
| Do | p-nitro | |
| Do | do | p-nitro. |
| Do | p-phenylsulfonyl | |
| Do | do | p-phenylsulfonyl. |
| p-methoxy | p-benzylthio | p-benzylthio. |
| Do | m-butyryloxy | m-butyryloxy. |
| Do | 2-chloro-4,5-dimethoxy | 2-chloro-4,5-dimethoxy. |
| Do | m-dimethylcarbamoyl | |
| o-methoxycarbonyl | | |
| Do | p-N-ethylphenyl sulfamoyl | |
| p-methoxycarbonyl | | |
| 4-methoxy-3-nitro | | |
| 2-methoxy-4-phenyl | | |
| o-methyl | p-benzoyloxy | p-benzoyloxy. |
| Do | o-methyl | o-methyl. |
| m-N-methylacetamido | p-methoxy | p-methoxy. |
| o-N-methylacetamido | o-N-ethylbutyramido | o-N-ethylbutyramido. |
| Do | o-N-methylacetamido | |
| Do | do | o-N-methylacetamido. |
| o-N-methypropionamido | | |
| o-methylthio | | |
| p-methylthio | p-methoxy | p-methoxy. |
| Do | p-methylthio | |
| Do | do | p-methylthio. |
| o-1-naphthyl | p-phenoxy | |
| o-2-naphthyl | | |
| m-nitro | 2,4-dimethoxy | 2,4-dimethoxy. |
| Do | 2,4-dimethylthio | |
| o-t-pentyl | | |
| p-pentyl | | |
| o-pentyloxy | | |
| p-pentyloxy | | |
| o-pentyloxycarbonyl | | |
| o-phenoxy | | |

I. PHENYL SUBSTITUTED IMIDAZOLYL RADICALS—Continued

| Substituents of phenyl rings attached at— | | |
|---|---|---|
| 2-Position | 4-Position | 5-Position |
| o-phenoxy | 3,4,5-trimethoxy | 3,4,5-trimethoxy. |
| p-phenoxy | p-methoxy | |
| m-phenyl | p-phenyl | p-phenyl. |
| o-phenyl | | |
| Do | p-methoxycarbonyl | p-methoxycarbonyl. |
| Do | m-pentyloxycarbonyl | |
| Do | do | m-pentyloxycarbonyl. |
| Do | p-phenyl | p-phenyl. |
| p-phenyl | do | Do. |
| p-phenylhydroazonomethyl | | |
| o-phenylthio | p-1-naphthylthio | p-1-naphthylthio. |
| p-phenylthio | p-methoxy | p-methoxy. |
| o-propoxy | | |
| 2,4,6-tribromo | | |
| 2,4,6-tributyl | | |
| 2,4,6-trimethyl | | |
| 2,3,5-trichloro | | |
| 2,4,6-trichloro | | |
| Do | o-butylthio | |
| 2,4,6-tricyano | p-cyano | p-cyano. |
| 2,4,6-triethoxy | | |
| p-trifluoromethoxy | | |
| 2,3,4-trimethoxy | | |
| 2,4,6-trimethoxy | | |
| 3,4,5-trimethoxy | | |
| 3,4,5-trimethyl | 3,4,5-trimethyl | 3,4,5-trimethyl. |
| 2,4,6-tripropoxy | | |
| | o-t-butoxy | |
| | p-butoxy | |
| | 4-t-butoxy-2-methoxy | |
| | p-t-butyl | |
| | p-t-butylthio | p-t-butylthio. |
| | o-chloro | 2,5-dimethoxy. |
| | 2-chloro-4-methoxy | |
| | 2-cyano-2,4-dimethoxy | |
| | 2,3-dichloro | 2,4-dimethylthio. |
| | 2,4-dimethoxy | |
| | do | 2,4,5-trimethoxy. |
| | 2,5-dimethyl | 2,5-dimethyl. |
| | 2,5-dipentyl | |
| | o-methoxy | o-methoxy. |
| | do | p-methoxy. |
| | 4-methoxy-3-nitro | 2-methoxy-4-methyl. |
| | o-methyl | 2,4,5-trimethoxy. |
| | p-methyl | |
| | p-methylthio | |
| | do | p-methylthio. |
| | p-pentyl | |
| | p-t-pentyloxy | p-t-pentyloxy. |
| | 2,4,5-trimethoxy | p-methoxy. |
| | 2,4,5-trimethyl | |

II. OTHER RING GROUPS THAN PHENYL IN IMIDAZOLYL RADICAL

| 2-position | 4-position | 5-position |
|---|---|---|
| 2,4-dipentylphenyl | 2-naphthyl | 2-naphthyl. |
| p-methoxyphenyl | do | Do. |
| o-methoxycarbonyl phenyl | do | phenyl. |
| (1-methoxy-2-naphthyl) | phenyl | Do. |
| (3-methoxy-2-naphthyl) | do | Do. |
| 1-naphthyl | do | Do. |
| o-pentyloxycarbonylphenyl | 2-naphthyl | 2-naphthyl. |
| 3-pyridyl | phenyl | phenyl. |

The above dimers of 2,4,5-triarylimidazolyl radicals which provide light-activated components for the invention compositions are characterized by the property of dissociating into two triarylimidazolyl free radicals when illuminated with ultraviolet light of the aforementioned wave length. Such a dissociation may be detected, and the existence of the free radicals discerned, by electron paramagnetic resonance, by ultraviolet spectra, and by visible spectra.

The triarylimidazoles which are intermediates for the biimidazoles or dimers of the 2,4,5-triarylimidazolyl radicals are prepared as follows:

(A) By refluxing, in glacial acetic acid containing ammonium acetate, benzil, a related compound such as a binaphthoyl or a naphthylphenylglyoxal, or an appropriately substituted compound of the benzil type with an aromatic aldehyde such as benzaldehyde, naphthaldehyde, a phenanthraldehyde or with picolinaldehyde, a nicotinaldehyde, a thiophenecarboxaldehyde or a suitably substituted aldehyde of these types. The reaction product is precipitated by drowning the reaction mass, e.g., in water or in an ammonium hydroxide solution, and is recovered by filtration. The product can then be purified by recrystallization from a solvent. This procedure is described by Davidson et al., J. Org. Chem. 2, 319 (1937).

(B) By refluxing a benzoin and one of the above-mentioned aldehydes in methanol in the presence of copper acetate and ammonia. This is an adaptation of the procedure of Wiedenhagen et al., Ber. 70, 570 (1937).

(C) By heating a benzil or above-named related compound with an aforementioned aldehyde at 180° to 190° C. in formamide solution as disclosed in Belgian Patent 589,417.

The intermediate triarylimidazole is dissolved in ethanol containing potassium hydroxide and then oxidized to the corresponding biimidazole or dimer of the triarylimidazolyl radical by treatment with aqueous potassium ferricyanide. The desired product precipitates from the reaction mixture, is isolated by filtration, and is washed free from ferricyanide with water. This procedure is described by Hayashi et al., Bull. Chem. Soc. Japan, 33,565 (1960).

The triarylimidazole may also be oxidized by agitating a benzene or chloroform solution of the imidazole with lead dioxide ($PbO_2$) or by passing a saturated solution of the imidazole in benzene through a column packed with $PbO_2$ and diatomaceous earth.

These dimers exist in isomeric forms which are differentiated by the manner in which the radicals composing the dimers are linked together and which exhibit different spectral and thermotropic properties.

The preferred method, involving oxidative dimerization of the corresponding triarylimidazole with ferricyanide in alkali, generally yields the 1,2′-biimidazoles, although other isomers, such as the 1,1′,1,4′,2,2′,2,4′ and 4,4′-biimidazoles are sometimes also obtained admixed with the 1,2′-isomer. For the purposes of this invention, it is immaterial which isomer is employed so long as it is photodissociable to the triaryl imidizolyl radicals which are the effective oxidizing agents of the invention compositions.

(C) The compositions of the invention

The invention biimidazoles are phototropic, i.e., they change color upon exposure to ultraviolet radiation and return to their original color after the light source is removed. They may by virtue of this property contribute some color to the image that is produced when a leuco dye composition containing a biimidazole is irradiated. This color is, however, fugitive. It fades at varying rates depending upon the substituent group in the biimidazole, and is not relied upon to color the image produced by radiation. The leuco dye component provides the permanent colored image when reacted upon by the free radicals of the biimidazole when the biimidazole is activated by ultraviolet light. The primary purpose of the biimidazole, then, is to furnish a photosensitive material which, upon radiation, is activated to react with the leuco dye to develop color in accordance with the pattern of an irradiated area.

The hexaarylbiimidazoles are also thermally dissociable to triarylimidazolyl radicals and thus their combinations with leuco dyes are also thermally activatable for color formation. Therefore, in formulating compositions designed for photoimaging, components should be selected which possess satisfactory dark stability at temperatures normally encountered during storage and handling of such compositions. In this regard, preferred biimidazoles are those having ortho-substituted phenyl groups at the 2 and 2′ positions, the substituents being ortho to the point of attachment to the imidazole ring; and preferred leuco dyes are triarylmethanes wherein at least two of the aryls are p-substituted aminophenyl groups having a selected substituent ortho to the methane carbon, as defined earlier.

Hexaarylbiimidazoles which thermally dissociate at room temperature or below may be used in photoactivated embodiments of the invention but require special processing to prevent the biimidazole from contacting the aminotriarylmethane until the photosensitive composition is ready for exposure to light. One method is to encapsulate such hexaarylbiimidazoles in tiny capsules and incorporate them into the invention compositions where they can be retained indefinitely therein, separate from the color generators, until the capsules are ruptured by pressure, heat or other means. Here, too, excellent dark stability of the photosensitive composition is achieved when the aminotriarylmethane has the preferred structure set forth above.

The leuco form of the dye and the dimer of the 2,4,5-triarylimidazolyl radical may be mixed in mole ratios within the range from about 10:1 (leuco dye:dimer) to about 1:10. In the presence of a small quantity of solvent, including moisture, such mixtures will produce on substrates a permanent image when irradiated with ultraviolet light. The preferred ratio range is 2:1 to 1:2, while the preferred ratio is about 1:1.

(D) Acids for leuco dye salt formation

With the leuco form of dyes which have amino or substituted amino groups within the dye structure and which are characterized as cationic dyes, an amine salt-forming mineral acid, organic acid, or an acid from a compound supplying acid is employed. The amount of acid usually varies from 0.33 mole to 1 mole per mole of amino nitrogen in the dye. The preferred quantity of acid is about .5 to .9 mole per mole of amino nitrogen. Acid in an amount in excess of that required to form a salt with the amino nitrogen should be avoided because excess acid reduces the reactivity of the light-activated biimidazole and renders the composition less light-sensitive. Representative acids which form the required amine salts are hydrochloric, hydrobromic, sulfuric, nitric, phosphoric, acetic, oxalic, p-toluenesulfonic, trichloroacetic, trifluoroacetic and perfluoroheptanoic acid. Other acids such as acids in the "Lewis" sense or acid sources which may be employed in the presence of water or moisture include zinc chloride, zinc bromide, and ferric chloride. Representative leuco dye salts include tris (4-diethylamino-o-tolyl) methane zinc chloride, tris (4-diethylamino-o-tolyl) methane oxalate, tris (4-diethylamino-o-tolyl) methane p-toluenesulfonate and the like.

With the leuco form of dyes which produce dyes by the removal of two hydrogen atoms, acid is not needed and in most cases should be avoided to prevent desensitizing the light-sensitive composition.

(E) Solvents

Solvents which are inert toward the leuco form of the dye and the dimer of the triarylimidazolyl radical are usually employed to dissolve these components and thereby mix them together and to provide a fluid medium for a convenient and ready application of the light-sensitive composition to substrates. To obtain the final coated article the solvent is normally removed as, e.g., by evaporation. It is often beneficial to leave a small residue of solvent in the dried composition so that the desired degree of imaging can be obtained upon subsequent irradiation. Exhaustively dried compositions tend to produce less acceptable images. Loss in light-sensitivity resulting from complete drying can be restored, however, by introducing a small amount of solvent as by spraying, brushing, dipping and the like. Any small residue of solvent left in the dried composition does not mean that the substrate, paper for instance, must necessarily be wet, humidified, or otherwise specially handled. Numerous solvents such as N,N-dimethylformamide, N,N-diethylacetamide, dimethylsulfoxide are so strongly adsorbed by cellulosic and plastic substrates that prolonged heating under vacuum is necessary for complete solvent removal. Ordinary drying such as that employed in paper manufacture or in film casting results in the retention of ample solvent to give a composition with good photosensitivity. The compositions so produced are definitely dry to the touch and stable to storage at room temperature. Indeed, moisture of the air is adsorbed by many of the compositions, particularly those comprising an acid salt of an amino leuco form of a dye on cellulosic substrates, and serves as a suitable solvent.

Volatile solvents such as methanol, ethanol and the like may be removed from cellulosic materials readily and completely enough to reduce the photosensitivity of the composition to impractically low levels. When such combinations of solvents-substrates are employed, images are best formed when the substrate is wet to the touch. When such solvents are used the treated substrate (paper or film) should be stored under conditions which prevent solvent evaporation. Solvents of this type offer the advantage that after imaging, simple drying prevents color formation in uncolored areas.

In general, a solvent should dissolve all components, i.e. the leuco dye, biimidazole and binder, if employed, but be inert to the photosensitive materials. It should also be inert to and wet but not dissolve the substrate to which the photosensitive materials are applied. During the color-forming (imaging) step it is believed the solvent functions to loosen the molecular packing in the leuco dye/biimidazole compositions so as to allow the triarylimidazolyl radicals that are formed when the dimer dissociates to diffuse apart and thus to more easily diffuse together with and consequently oxidize the leuco component to its dye form. This can also be accomplished by heating the composition to melting, with or without a solvent present, while simultaneously irradiating with ultraviolet light, if desired.

In general, a suitable solvent has a boiling point of at least 40° C. at atmospheric pressure. Solvents with low vapor pressures and consequent high boiling points may be used. Their failure to be readily removed by evaporation will not present a problem, if the quantity used is restricted, as it readily can be in mixtures of solvents with relatively high vapor pressures. It is preferable to have at least 0.5% by weight of solvent retained by such a substrate as paper to ensure image formation upon irradiation. Among the solvents which have been and may be employed are amides such as formamide, N,N-dimethylformamide, N,N-dimethylacetamide, hexanamide, stearamide; alcohols and ether alcohols such as methanol, ethanol, 1-propanol, 2-propanol, butanol, ethylene glycol, polyethylene glycol; esters such as ethyl acetate, ethyl benzoate; aromatics such as benzene, o-dichlorobenzene, toluene; ketones such as acetone, methyl ethyl ketone, 3-pentanone; aliphatic halocarbons such as methylene chloride, chloroform, 1,1,2-trichloroethane, 1,1,2,2-tetrachloroethane, 1,1,2-trichloroethylene; miscellaneous solvents such as dimethylsulfoxide, pyridine, tetrahydrofuran, dioxane, dicyanocyclobutane, 1 - methyl-2-oxohexamethylenimine; and mixtures of these solvents in various proportions as may be required to attain solution of the particular leuco dye and biimidazole selected for use in a composition.

(F) Binders and plasticizers

Polymeric binders may also be present in the light-sensitive compositions to thicken them or adhere them to substrates. Binder can also serve as a matrix for the color-forming composition and the mixture may be cast, extruded or otherwise formed into unsupported imageable films. Light-transparent and film-forming polymers, are preferred. Examples are ethyl cellulose, polyvinyl alcohol, polyvinyl chloride, polystyrene, polyvinyl acetate, poly (methyl methacrylate), cellulose acetate, cellulose butyrate, cellulose acetate butyrate, cellulose nitrate, chlorinated rubber, copolymers of the above vinyl monomers, and gelatin. Binder or matrix amounts vary from about 0.5 part to about 200 parts by weight per part of combined weight of aminotriarylmethane and photooxidant. In general from 0.5 part to 10 parts are used as adhesive or thickener, while higher amounts are used to form the unsupported films. With certain polymers, it may be desirable to add a plasticizer to give flexibility to the film or coating. Plasticizers include the polyethylene glycols such as the commercially available carbowaxes, and related materials, such as substituted phenol-ethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates butyrates and other carboxylate esters of ethylene glycol, diethyleneglycol, glycerol, pentaerythritol and other polyhydric alcohols, and alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

(G) Substrates

In use, the compositions are usually coated upon substrates. The substrates are materials which bear the light-sensitive, image-forming compositions as a coating or impregnant. They are materials commonly used in the graphic arts and in decorative applications. These materials include paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass, wood and metals. Opaque as well as transparent substrates can be used. Substrates in which the photosensitive components are dissolved or which bear the photosensitive components as a coating on the reverse side of the substrate, i.e., on the side away from the ultraviolet light source used for image formation, must be transparent not only in the visible region but transparent to a portion of the ultraviolet range useful for image formation. The substrates must also be inert to the photosensitive materials and preferably should not dissolve the active components but adsorb them and retain sufficient solvent to proivde a medium for rapid image formation upon irradiation. Reactive resins, drying oil, and other agents which may adversely affect image formation by the photosensitive composition are to be avoided.

(H) Preparation of compositions

A common procedure is to make a solution of a leuco dye ranging in concentration from about 0.5% by weight to the limit of the solubility of the compounds in a solvent comprising, for instance, 50:50 by volume of N,N-dimethylformamide and benzene, and to add to this solution a dimer of a 2,4,5-triarylimidazolyl radical in an amount equivalent on a molar basis to the leuco dye. Optionally, a binder such as polyvinyl alcohol may be added to the solution. The selection of the leuco dye will depend upon the color and quality of the image desired. Two or more leuco dyes may be used in combination to obtain a particular color or shade of color or to provide a neutral gray or black coloration in the image.

In applying a solution to paper, films, fabrics, or to the surfaces of rigid substrates such as glass, wood or metals the solution may be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of leuco dye and the equivalent amount of biimidazole activator. Images of greater and lesser intensity of color are provided by the application of greater and lesser amounts of leuco dye to the substrate. For coating roll papers and films there may be used such typical devices for continuously laying down wet films as nip fed three roll reverse roll coating heads, gravure coaters, trailing blade coaters and Mayer bar coating heads (wherein the coating thickness is controlled by a threaded or a wire wound bar). The wet thickness is adjusted such that the dry thickness after solvent removal is in the desired range (about .1–1.5 mil, usually around .3–.5 mil on paper, .8–1.1 mil on film).

The substrates bearing the solution of the leuco dye and biimidazole, and optionally a binder, may be dried simply at room temperature. They also may be dried under vacuum at room temperature by forced air solvent evaporation, or at elevated temperatures, as by radiant heating. The upper temperature limit is important in combination with exposure time. A short exposure to heat of 90° C. may not be detectably harmful, while several hours' exposure to this heat may reduce the light sensitivity of the composition.

(I) Light sources and image formation

Any convenient source of ultraviolet light may be used to activate the light-sensitive composition and induce the formation of an image. In general, light sources that supply radiation in the region between about 2000 A. and about 4200 A. are useful in producing images with the leuco dye-hexaarylbiimidazole-solvent compositions on numerous substrates. Among the light sources which have been employed are sun lamps, electronic flash guns, germicidal lamps, ultraviolet lamps providing specifically light of short wave length (2537 A.) and lamps providing light of long wave length (2537 A.). The light exposure time will vary from a fraction of a second to several minutes depending upon the intensity of the light, its distance from the light-sensitive composition, the nature and amount of the light-sensitive composition available, and the intensity of color in the image desired. There may also be used coherent light beams, for example, pulsed nitrogen lasers, argon ion lasers and ionized Neon II lasers, whose emissions fall within or overlap the ultraviolet absorption bands of the triarylimidazolyl dimer.

Ultraviolet emitting cathode ray tubes widely useful in printout systems for writing on photosensitive materials are also useful for imaging the subject compositions. These in general involve a UV-emitting phosphor internal coating as the means for converting electrical energy to light energy and a fiber optic face plate as the means for directing the radiation to the photosensitive target. For purposes of this invention, the phosphors should emit strongly below 420 mu (4200 A.) so as to substantially overlap the near UV-absorption characteristic of the novel imaging compositions. Representative phosphors include the P4B (emitting at 300–550 mu, peaking at 410 mu), P16 (330–460, peaking at 380 mu) and P22B (390–510, peaking at 450 mu) types. Other phosphors which may be used are the P11 (400–560 mu, peaking at 460 mu) and $ZrP_2O_7$ types. (The Electronic Industries Association, New York, N.Y., assigns P-numbers and provides characterizing information on the phosphors; phosphors with the same P-number have substantially identical characteristics.)

Images may be formed by a beam of light or by exposure to light of a selected area behind a negative, a stencil, or other relatively opaque pattern. The negative may be a silver negative with cellulose acetate or polyester film. The negative may also be one in which the opacity results from aggregations of areas of different refractive index. Image formation may also be accomplished in conventional diazo printing apparatus, or in a thermography device, provided the instrument emits some of its light in the ultraviolet range. A piece of onionskin or light-to-medium-weight bond paper which bears typewriting, for example, will serve as a master pattern from which copies can be made.

The subject compositions are also activatable for the purposes of this invention by electron beams. The optimum conditions depend on the formulation and its thickness, the electron beam energy and the exposure time, and are readily determined by trail. Beams having average electron energies as low as about 10 kilovolts and as high as about 2 million electron volts have been used successfully.

(J) Fixing treatment

In order to retain an image once it has been formed, color development in the unilluminated portions of the image pattern by exposure to ultraviolet light must be avoided. One way the original image is preserved is to apply to the imaged material, e.g., paper, film, fabric or whatever the substrate, by spraying or by immersion, a solution of hydroquinone. Hydroquinone is more susceptible to hydrogen abstraction than is the leuco dye, and it preferentially reacts with any activated biimidazole without color formation. Printed compositions so "fixed" with hydroquinone have a lasting quality and are little or not at all affected by any subsequent ultraviolet light exposure. The image itself will, of course, be subject to color change in accordance with the fastness to light of the particular dye employed.

Another fixing treatment consists of washing with water the unreacted leuco dye, after an image has been formed, from the material to which the light-sensitive composition has been applied.

(K) Usefulness

The novel compositions and the oxidation method of this invention are useful in such diverse fields as organic synthesis, including dye manufacture, dyeing of textiles and other materials, photography, thermography and pattern layout. The compositions are also useful to sense thresholds of light, heat, pressure and combinations thereof, through the color changes they undergo when activated by such stimuli. Some specific uses are:

(1) Radiation dosimeters.—These compositions may be used as papers to determine easily the quantity of solar radiation that falls on a particular surface. It may also be useful to employ these as low cost light-meters in photographic applications. For these uses, it is necessary to compare areas which have been exposed to previously calibrated papers or surfaces, in order to allow easy analysis of the degree of radiation.

(2) Blue prints.—These light-sensitive compositions can find application in diazo printout equipment, where they can be made to give readily a variety of shades, with different speeds and sensitivities. It is possible to utilize these materials with caution in ordinary room light, rather than have to handle them in the dark.

(3) Printing applications.—This invention is particularly useful for light-actuated colored image formation and provides a dry, non-silver photographic process capable of imaging in various colors and shades on various substrates, including fabrics, paper and similar fibrous sheet material. Apparatus useful in conducting photographic dye-printing is described in U.S. Patents 2,214,365 and 2,655,802. Even very soft paper, as for example tissue paper, which has been treated with a mixture of hexaarylbiimidazole and a color-forming oxidizable system of this invention, can be readily printed by projecting the desired graphic pattern onto the treated paper and irradiating it to effect the color-forming oxidation reaction. Subsequently, the image may be fixed by a variety of methods, including washing out of the unreacted leuco dyes by simple treatment with water. These soft tissue paper compositions cannot be readily imaged by conventional printing techniques.

In general this photo-imaging method is broadly useful for optical printing and anywhere it is desirable to capture images as in photography, pattern-making, reproducing written, printed, drawn or typed matter, and recording radiation signals as line graphics, alphanumerics or other characters. The applied radiation can be passed through stencils, negatives or transparencies including half-tone and continuous tone negatives and positives in contact with or projected onto the radiation-sensitive image-fix composition; or, it can be reflected for impingement on the radiation-sensitive material from printed or typed copy or objects that are opaque or transmit radiation poorly. Similarly, images of objects having areas differing in absorption and transmission characteristics are captured by placing the objects between the first radiation source and the radiation-sensitive surface, e.g., foot images can be recorded for fitting shoes. Multiple copies can be made using a single imaging exposure by stacking radiation-transparent assemblies comprising the imaging composition coated on a transparent substrate such as UV-transparent film, paper or glass.

In imaging applications, the ultimately desired dye optical density pattern can be constructed stepwise, according to one or more patterns, by exposing previously unexposed areas to suitable activating radiation and/or by reexposing previously underexposed areas (i.e., areas wherein the maximum obtainable optical density has not yet been fully developed) to one or more additional exposures. Such "add on" capability and versatility of the invention compositions is particularly useful in recording information and creating electronically generated displays and graphics. Because the recorded images have excellent resolution on paper and film, they can be greatly reduced in size for data storage. Information stored on such microfilms can be printed out on other microforms, if desired.

(L) Examples

Representative examples illustrating the present invention follow:

Example 1

Tris(4 - diethylamino-o-tolyl)methane trihydrochloride in an amount of 0.5 g. and 0.5 g. of 2,2'-bis(o-chlorophenyl)-4,4',5,5'-tetraphenylbiimidazole are dissolved in 100 ml. of a solution of equal parts by volume of benzene and N,N-dimethylformamide. The resultant solution is used to impregnate 1000 square inches of filter paper, and the paper is dried at 40° C. for half an hour in a blower oven. The treated paper is colorless. When a strip of it is partly covered and exposed to the light of a photographic flash gun for 0.001 sec. the uncovered area turns an intense blue color. Similarly, another strip of the treated paper exposed to direct sunlight for 5 sec. becomes blue.

Color also develops, but to a less intense degree, when paper is treated with 0.1 of the above concentration of leuco dye and biimidazole and exposed to both these sources of ultraviolet light.

When cotton fabric is immersed in the above leuco dye-biimidazole solutions and similarly dried it is rendered photosensitive and undergoes blue coloration on exposure to the ultraviolet light.

When the 0.5% by weight solution of each of the above leuco dye and biimidazole is sprayed onto tissue paper, the paper becomes photosensitive and blue coloring appears on exposure to sunlight where contact with the solution occurs.

To 100 parts by volume of the benzene-dimethylformamide solution containing 0.5 part by weight each of the above leuco dye and biimidazole is added 0.25 part by weight of ethyl cellulose. This solution is used to impregnate and coat filter paper, bond paper, sized paper, and cardboard. The various papers dried in the oven at 40° C. are colorless, photosensitive specimens until irradiated and then they present a blue coloration. A portion of this same solution is also used to coat anodized aluminum, glass, and a polyester film. Evaporation of the solvent leaves an adherent coating of a photosensitive composition on each of these substrates. A blue color forms in the surface film upon exposure to ultraviolet light.

When the bis(o-chlorophenyl)tetraphenylbiimidazole in the above solution is replaced with 2,2',4,4',5,5'-hexaphenylbiimidazole a photosensitive composition is formed that can be similarly applied to paper and other substrates for the development of blue color upon illumination with ultraviolet light.

Example 2

Bis(4 - dimethylamino-o-tolyl)phenylmethane dihydrochloride is used in place of the leuco dye of Example 1 in the 0.5% solution, and the solution is used to impregnate paper as described in the previous example. The resultant composition produces an intense green color when exposed to ultraviolet light. A less intense but definitely discernable coloration is obtained when 0.1 of this concentration of this leuco dye and biimidazole sensitizer is used in preparing the photosensitive paper specimens.

Example 3

When the leuco dye in the solution of the first part of Example 1 comprises 0.25 g. each of the leuco dyes of Example 1 and Example 2 the photosensitive composition produces a blue-green color when irradiated on paper. By varying the proportions of these leuco dyes various blue-green shades ranging from blue to green are obtained.

Example 4

When 0.25 g. each of the leuco dye of Example 1 and of Example 2 and of 4,4'-dihydroxy-3,3',5,5'-tetrabromobiphenyl taken in combination compose the leuco dye in the solution of Example 1 and paper is rendered photosensitive with this composition, a brown color develops upon exposure to ultra-violet light. When three times this concentration of each of the same leuco dyes is employed, the color formed on the paper by illumination is black.

Example 5

A permanent image is formed by the following procedure: A sheet of paper is briefly immersed in a solution of equal parts of benzene and N,N-dimethylformamide containing 0.5% each of tris(4-diethylamino-o-toyl)methane trihydrochloride and 2,2'-bis(o-chlorophenyl)-4,4',5,5'-tetraphenylbiimidazole. The impregnated paper is dried at 80° C. for two minutes. The paper then illuminated with the light from a photographic flashgun through a photographic film negative bears a distinct, clear image in blue color. The exposed, printed paper is now immersed in a saturated ether solution of hydroquinone for about 10 seconds, removed, and allowed to dry. The image is thus "fixed" and is unaltered by further exposure to light; the treatment with hydroquinone has prevented further color formation.

Herewith follows a series of examples of various leuco dyes which are used at a concentration of 0.5% in combination with 2,2' - bis(o-chlorophenyl)-4,4',5,5'-tetraphenylbiimidazole with a concentration of 0.5% in a 50:50 benzene-N,N-dimethylformamide solution to provide a composition for photosensitizing paper as described in Example 1. The color of the image produced on exposure to ultraviolet light is given together with the particular leuco form of the dye present in a composition.

| Ex. No. | Leuco Dye | Color of Light-Induced Image |
|---|---|---|
| 6 | Tris(p-hydroxyphenyl)methane | Red. |
| 7 | (4-diethylamino-o-tolyl)phenylmethane dihydrochloride.* | Green. |
| 8 | Double zinc chloride salt of 3,6-bis(diethylamino)-9-(o-ethoxycarbonylphenyl)-xanthane. | Red. |
| 9 | Double zinc chloride salt of 9,10-dihydro-3,6-bis-(dimethylamino)-9-phenylacridine. | Red. |
| 10 | Zinc chloride salt of 9-dimethylamino-benzo [a] phenoxazine. | Blue. |
| 11 | Double zinc chloride salt of 3,7-bis(dimethyl-amino)phenothiazine. | Do. |
| 12 | Phenothiazine | Blue-Green. |
| 13 | Zinc chloride salt of 5,10-dihydro-3,7-bis(dimethyl-amino)-5-phenylphenazine. | Blue. |
| 14 | Bis(p-dimethylaminophenyl)piperidinomethane | Do. |
| 15 | 4-amino-4'-dimethylaminodiphenylamine | Do. |
| 16 | p-(p-Dimethylaminoanilino)phenol | Do. |
| 17 | p-(2,2-dicyanoethyl)-N,N-dimethylaniline | Yellow. |
| 18 | p-(1,2,2-tricyanoethyl)-N,N-dimethylaniline | Orange. |
| 19 | α,β-Dicyano-4-diethylaminohydrocinnamic acid, methyl ester.* | Do. |
| 20 | 1-p-dimethylaminophenyl-2-p-nitrophenyl hydrazine | Do. |
| 21 | Leuco thioindigo | Red. |
| 22 | 2,3-dihydro-1,4-bis(methylamino)anthraquinone | Blue. |
| 23 | 3,3',5,5'-tetrabromo-p,p-biphenol | Orange. |
| 24 | 2-(p-hydroxyphenyl)-4,5-diphenylimidazole | Red. |
| 25 | p-Phenylenediamine | Gray. |

*The solvent employed in this example was an 85/15 mixture of N,N-dimethylformamide/methanol.

In another series of examples, dimers of various 2,4,5-triarylimidazolyl radicals are used at a concentration of 0.15% in combination with tris(4-diethylamino-o-tolyl)-methane trihydrochloride at a concentration of 0.15% in a 50:50 benzene-N,N-dimethylformamide solution to provide a composition for photosensitizing paper as described in Example 1. The particular imidazolyl radical, which composed the biimidazole present in combination with the leuco dye, and the color of the image produced on exposure to ultraviolet light are given in the following table.

| Ex. No. | Imidazolyl radical of dimer in composition | Color of Light-Induced Image |
|---|---|---|
| 26 | 2-(p-benzylthiophenyl)-4,5-diphenyl | Blue. |
| 27 | 4,5-bis(p-benzylthiophenyl)-2-phenyl | Do. |
| 28 | 2,4,5-tris(p-benzylthiophenyl) | Green. |
| 29 | 2-(m-bromophenyl)-4,5-diphenyl | Blue. |
| 30 | 2-(o-bromophenyl)-4,5-diphenyl | Do. |
| 31 | 2-(p-bromophenyl)-4,5-diphenyl | Do. |
| 32 | 2-(bromophenyl)-4,5-bis(p-methoxyphenyl) | Do. |
| 33 | 2-(p-carboxyphenyl)-4,5-diphenyl | Do. |
| 34 | 2-(m-chlorophenyl)-4,5-diphenyl | Do. |
| 35 | 2-(m-chlorophenyl)-4,5-bis(p-methoxyphenyl) | Do. |
| 36 | 2-(o-chlorophenyl)-4,5-bis(p-methoxyphenyl) | Do. |
| 37 | 2-(o-chlorophenyl)-4-(1-naphthyl)-5-phenyl | Do. |
| 38 | 2-(p-chlorophenyl)-4,5-diphenyl | Do. |
| 39 | 2-(p-chlorophenyl)-4,5-bis(p-methoxyphenyl) | Do. |
| 40 | 2-(2,4-dichlorophenyl)-4,5-diphenyl | Do. |
| 41 | 4-(o-chlorophenyl)-2,5-diphenyl | Do. |
| 42 | 4,5-bis(o-chlorophenyl)-2-phenyl | Do. |
| 43 | 2-(p-cyanophenyl)-4,5-diphenyl | Do. |
| 44 | 2-(p-cyanophenyl)-4,5-bis(p-methoxyphenyl) | Green. |
| 45 | 2-(p-ethoxyphenyl)-4,5-diphenyl | Blue. |
| 46 | 2-(p-iodophenyl)-4,5-diphenyl | Do. |
| 47 | 2-(m-fluorophenyl)-4,5-diphenyl | Do. |
| 48 | 2-(o-fluorophenyl)-4,5-diphenyl | Do. |
| 49 | 2-(p-fluorophenyl)-4,5-diphenyl | Do. |
| 50 | 2-(4-trifluoromethoxycyclohexyl)-4,5-diphenyl | Do. |
| 51 | 2-(p-trifluoromethylsulfonylphenyl)-4,5-diphenyl | Do. |
| 52 | 2-(o-methoxyphenyl)-4,5-bis(p-methoxyphenyl) | Do. |
| 53 | 2-(p-methoxyphenyl)-4,5-diphenyl | Do. |
| 54 | 2-(p-methoxyphenyl)-4-(o-methoxyphenyl)-5-phenyl. | Do. |
| 55 | 2-(p-methoxyphenyl)-4,5-bis(o-methoxyphenyl) | Do. |
| 56 | 4-(o-methoxyphenyl)-2,5-diphenyl | Do. |
| 57 | 4-(p-methoxyphenyl)-2,5-diphenyl | Do. |
| 58 | 2-(o-methoxyphenyl)-4-(p-methoxyphenyl)-5-phenyl. | Do. |
| 59 | 2,4-bis(o-methoxyphenyl)-5-phenyl | Do. |
| 60 | 2,4-bis(p-methoxyphenyl)-5-phenyl | Green-Blue. |
| 61 | 4,5-bis(p-methoxyphenyl)-2-(2,4-dichlorophenyl) | Blue. |
| 62 | 4,5-bis(p-methoxyphenyl)-2-(1-naphthyl) | Do. |
| 63 | 4,5-bis(p-methoxyphenyl)-2-phenyl | Do. |
| 64 | 2,4,5-tris(o-methoxyphenyl) | Do. |
| 65 | 2,4,5-tris(p-methoxyphenyl) | Green-Blue. |
| 66 | 2-(2,3-dimethoxyphenyl)-4,5-diphenyl | Blue. |
| 67 | 2-(2,4-dimethoxyphenyl)-4,5-diphenyl | Green-Blue. |
| 68 | 2-(3,4-dimethoxyphenyl)-4,5-diphenyl | Do. |
| 69 | 2-(2,4,6-trimethylphenyl)-4,5-diphenyl | Blue. |
| 70 | 2-(3,4-methylenedioxyphenyl)-4,5-diphenyl | Green-Blue. |
| 71 | 2-(p-methylthiophenyl)-4,5-diphenyl | Blue. |
| 72 | 2-(1-naphthyl)-4,5-diphenyl | Do. |
| 73 | 4-(1-naphthyl)-2,5-diphenyl | Do. |
| 74 | 2,4-di(1-naphthyl)-5-phenyl | Do. |
| 75 | 4,5-di(1-naphthyl)-2-phenyl | Do. |
| 76 | 2,4,5-tri(1-naphthyl) | Do. |
| 77 | 2-(2-naphthyl)-4,5-diphenyl | Do. |
| 78 | 2-(m-nitrophenyl)-4,5-diphenyl | Do. |
| 79 | 2-(p-nitrophenyl)-4,5-diphenyl | Green. |
| 80 | 2-(p-nitrophenyl)-4,5-bis(p-methoxyphenyl) | Do. |
| 81 | 2-(4-chloro-1-naphthyl)-4,5-diphenyl | Do. |
| 82 | 2-(p-phenylsulfonylphenyl)-4,5-diphenyl | Do. |
| 83 | 4,5-diphenyl-2-(p-sulfamoylphenyl) | Do. |
| 84 | 4,5-diphenyl-2-(2-thienyl) | Green. |
| 85 | 4,5-diphenyl-2-(o-tolyl) | Do. |
| 86 | 2,5-diphenyl-4-(o-tolyl) | Do. |
| 87 | 2-phenyl-4,5-(o-tolyl) | Do. |
| 88 | 5-phenyl-4-(o-tolyl)-2-(p-tolyl) | Do. |
| 89 | 4,5-diphenyl-2-(p-tolyl) | Do. |
| 90 | 2-phenyl-4,5-di(2,4-xylyl) | Do. |
| 91 | 4,5-di(o-tolyl)-2-(p-tolyl) | Do. |
| 92 | 2-(o-methoxyphenyl)-4,5-diphenyl | Do. |
| 93 | 2-(o-chlorophenyl)-4,5-bis(m-methoxyphenyl) | |

The following Examples 92–98 illustrate the dark stabilities of preferred hexaarylbiimidazole/leuco dye photoimaging combinations.

A 2.6 sq. in. section of Whatman No. 1 filter paper is treated with 0.25 ml. of a solution $12.5 \times 10^{-3}$ molar in an aminotriarylmethane as listed below, $12.5 \times 10^{-3}$ molar in 2,2'-bis(o-chlorophenyl)-4,4',5,5'-tetraphenylbiimidazole, and $25 \times 10^{-3}$ molar in zinc bromide in 50/50 by volume N,N-dimethylformamide/benzene solution. The paper is dried at room temperature; each square inch contains about 0.5 mg. of the triarylmethane, 0.8 mg. of the biimidazole and 0.53 mg. of ZnBr$_2$.

| Example No. | Leuco Dye |
|---|---|
| 92 | Tris(4-diethylamino-o-tolyl)methane. |
| 93 | Bis(4-diethylamino-o-tolyl)(p-methoxyphenyl)methane. |
| 94 | Bis[4-(N-benzyl-N-ethylamino)-o-tolyl](p-methoxyphenyl)methane. |
| 95 | Bis(4-diethylamino-o-tolyl)phenylmethane. |
| 96 | Bis(4-diethylamino-o-tolyl)1-naphthylmethane. |
| 97 | Bis(4-diethylamino-2,5-xylyl)phenylmethane. |
| 98 | Bis(4-diethylamino-1-naphthyl)(4-diethylamino-o-tolyl)methane. |

A portion of each paper is exposed to a 275 watt sun lamp to establish the color-forming ability of each biimidazole-aminotriarylmethane combination. Each paper is then stored in the dark under conditions simulating ordinary darkroom storage conditions to determine its room temperature dark stability. After two weeks' and then after 18 months' storage the papers are examined visually. No change in the unexposed portion of the paper is noted after these periods. Substantially similar results are obtained on doubling the biimidazole concentration and omitting the zinc bromide in the above formulation.

Example 99

A sheet of filter paper is impregnated with a 50:50 by volume acetone:benzene solution in which is dissolved 0.5% by weight each of methyl α,β-dicyano-4-diethylaminohydrocinnamate and 2,2'-bis(o-fluorophenyl)-4,4',5,5'-tetraphenylbiimidazole. After drying under an infrared lamp, the impregnated paper is irradiated with a 275-watt sun lamp. The red color of methyl α,β-dicyano-4-diethylaminocinnamate appears.

Examples 100 and 101

In the same manner p-(1,2,2-tricyanoethyl)-N,N-dimethylaniline (formal oxidation potential=0.83 volt) is oxidized to the known orange-colored p-(1,2,2-tricyanovinyl)-N,N-dimethylaniline (McKusick et al., J. Am. Chem. Soc. 80, 2806 (1958)) and benzaldehyde 4-(1,2,2-tricyanoethyl)phenylhydrazine is oxidized to the known red-purple benzaldehyde 4-(1,2,2-tricyanovinyl)phenylhydrazone (Roland et al., J. Am. Chem. Soc. 83, 1652 (1961)).

Example 102

A solution of 5.2 g. (0.01 mole) of tris(4-diethylamino-o-tolyl)methane trihydrochloride and 6.6 g. (0.01 mole) of 2,2' - bis(o-chlorophenyl) - 4,4',5,5' - tetraphenylbiimidazole in 350 ml. ethanol is prepared in the dark. The solution is placed in a reaction vessel equipped with a mercury resonance lamp and, under an atmosphere of nitrogen, is subject to the irradiation from the lamp for 8 hours. The mercury resonance lamp and reaction vessel used are of the type described in "Techniques of Organic Chemistry," vol. II, page 275, Interscience Publishers, Inc., N.Y., 1956, with the modification that a quartz jacket is placed around the lamp.

After the 8 hours of irradiation, the solution which has changed from essentially colorless to dark blue is distilled under vacuum to remove the solvent. The solid residue weighs 12.3 g. and is an intense blue in color.

This blue solid is extracted with petroleum ether to remove any unreacted biimidazole. The solid which remains is extracted with 4000 ml. of benzene. Removal of the benzene from the extract by distillation gives 4.8 g. of blue solids which is chromatographed on neutral alumina using benzene as the eluent. Several bands develop on the column and 2.4 g. of 2-(o-chlorophenyl) - 4,5 - diphenylimidazole is recovered. The eluent is switched to 1:1 by volume benzene-chloroform and then to 2:1 by volume chloroform-benzene. A strong blue band remains on the column. This band is removed by elution with an 8:1:1 by volume benzene-chloroform-ethanol solution. Evaporation of this eluate gives 0.6 g. of the blue dye as a metallic-appearing solid. The visible spectrum of an ethanol solution of this solid as determined on a Perkin-Elmer Spectracord, Model 4000A, shows $\lambda_{max}$=610 m$\mu$ which is identical to the $\lambda_{max}$ of an authentic sample of the dye prepared by lead dioxide oxidation of tris(4-diethylamino-o-tolyl)methane.

The following leuco dye biimidazole combinations can be employed in the light-actuated oxidation procedure of Example 102 with similar results.

| Ex. No. | Leuco dye | Biimidazole |
|---|---|---|
| 103 | Bis(p-dimethylamino-o-tolyl)phenylmethane dihydrochloride. | 2,2'-bis(o-chlorophenyl)-4,4',5,5'-tetraphenylbiimidazole. |
| 104 | Tris(p-hydroxyphenyl)methane. | Do. |
| 105 | Bis(p-dimethylaminophenyl)piperidinomethane. | Do. |
| 106 | Tris(p-diethylamino-o-tolyl)methane trihydrochloride. | 2,2'-bis(p-chlorophenyl)-4,4',5,5'-tetrakis(p-methoxyphenyl)biimidazole. |
| 107 | do | 2,2'-bis(p-carboxyphenyl)-4,4',5,5'-tetraphenylbiimidazole. |
| 108 | do | 2,2'-bis(o-fluorophenyl)-4,4',5,5'-tetraphenylbiimidazole. |
| 109 | do | 2,2'-bis(p-methoxyphenyl)-4,4'-bis(o-methoxyphenyl)-5,5'-diphenylbiimidazole. |
| 110 | do | 2,2'-bis(3,4-methylenedioxyphenyl)4,4',5,5'-tetraphenylbiimidazole. |
| 111 | do | 2,2'-di-2-thienyl-4,4',5,5'-tetraphenylbiimidazole. |
| 112 | Tris(p-diethylaminophenyl)methane. | 2,2'-bis(o-fluorophenyl)-4,4',5,5'-tetraphenylbiimidazole. |

Example 113.—Imaging composition involving a hexaarylbiimidazole sulfonic acid

2 - (2 - chloro - 5 - sodium sulfonato-phenyl)-4,5-diphenyl imidazole was prepared by heating benzil, o-chlorobenzaldehyde-5-sodium sulfonate and ammonium acetate in glacial acetic acid. The imidazole was oxidatively coupled to the hexaarylbiimidazole by treating a 0.008 molar solution of imidazole in methanolic KOH with potassium ferricyanide at about 25–30° C. The dimer was isolated by evaporating the alcohol, dissolving in a little water and salting out the disodium salt with sodium sulfate.

The above dimer (0.002 mole) was dissolved in 50 ml. of water, and to the solution, under agitation, was added a solution of tris(N,N-diethylamino-o-tolyl)methane (0.002 mole) in 50 ml. of water containing just enough hydrochloric acid to solubilize the leuco base. The resulting precipitate was filtered, washed with water and dried in vacuo.

This composition, considered to have the structure

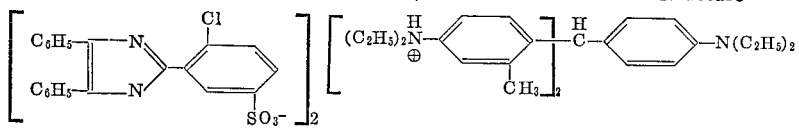

and consisting essentially of a salt of the leuco dye and the biimidazole disulfonic acid, turns blue (the color characteristic of the dye form of the leuco component) when irradiated as the dry powder, or in solution (e.g., in methanol) or as an impregnate or a coating on cellulosic or other substrates.

The preceding representative examples may be varied within the scope of the present total specification disclosure as understood and practiced by one skilled in the art to achieve essentially the same results.

The foregoing detailed description has been given for clearness of understanding only and no unnecessary limitations are to be understood therefrm. The invention is not limited to the exact details shown and described, for obvious modifications will occur to those skilled in the art.

The embodiments of the present invention in which an exclusive property or privilege is claimed are defined as follows:

1. An image-forming composition comprising an intimate admixture of (1) at least one dye in the leuco form having one to two removable hydrogens, the removal of which forms a differently colored compound; with the proviso that when the leuco form has only one removable hydrogen and the resultant dye is cationic, there is also present a mineral acid, organic acid or acid-supplying compound which forms a salt with the leuco form of the dye, and (2) at least one 2,4,5-triarylimidazolyl dimer of the formula

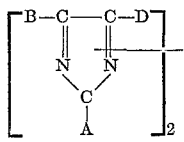

wherein A, B, and D are alike or different and are selected from the group consisting of substituted and unsubstituted radicals of homo and heterocyclic aromatic systems, said radicals each having no more than 26 carbon atoms.

2. The composition of claim 1 wherein component (1) is the salt of an acid of the leuco form of a triphenylmethane dye having, in at least two of the phenyl rings positioned para to the methane carbon atom, a substituent selected from the group consisting of amino, and $C_1$ to $C_4$ dialkyl amino groups, said acid being a mineral acid, an organic acid, or an acid-supplying compound and component (2) is the dimer of a 2,4,5-triphenylimidazolyl radical having an ortho substituent in the 2-phenyl and 2'-phenyl rings selected from the group consisting of chlorine, bromine, fluorine, methoxy, $C_1$ to $C_4$ alkyl and benzo.

3. The composition of claim 1 which contains, additionally, (3) an inert solvent.

4. An image-forming product comprising a supporting base carrying the composition of claim 1.

5. Paper treated with the composition of claim 1.

6. Film treated with the composition of claim 1.

7. The composition of claim 1 wherein component (1) is selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, leuco indamines, an aminohydrocinnamic acid, a hydrazine, a leuco indigoid dye, an amino-2,3-dihydroanthraquinone, a tetrahalo-p,p'-biphenol, a 2-(p-hydroxyphenyl)-4,5-diphenylimidazole and a phenethylaniline; and wherein in component (2) the aromatic groups are carbocyclic and may contain substituents selected from the group consisting of halogen, cyano, lower hydrocarbyl, lower alkoxy, aryloxy of 6–10 carbon atoms, lower alkylthio, arylthio of 6–10 carbon atoms, arylsulfonyl of 6–10 carbon atoms, nitro and lower alkyl carbonyl.

8. The composition of claim 7 wherein component (1) is an aminotriarylmethane.

9. The composition of claim 8 wherein the aminotriarylmethane is an aminotriphenylmethane in which at least two of the phenyl groups have (a) an $R_1R_2N$-substituent in the position para to the phenyl carbon that is bonded to the methane carbon wherein $R_1$ and $R_2$ are each selected from the group consisting of hydrogen, $C_1$ to $C_{10}$ alkyl, 2-hydroxyethyl, 2-cyanoethyl and benzyl, and (b) a substituent ortho to the phenyl carbon that is bonded to the methane carbon which is selected from the class consisting of lower alkyl, lower alkoxy, fluorine, chlorine and bromine; and wherein in component (2) the A aromatic carbocyclic rings are phenyl rings which bear an ortho substituent selected from the class consisting of lower alkyl, lower alkoxy, chloro, fluoro and bromo, and the B and D aromatic carbocyclic rings are phenyl rings which can bear a lower alkoxy substituent.

10. The composition of claim 9 wherein the 2,4,5-triarylimidazolyl dimer is the dimer of a 2-(o-chlorophenyl)-4,5-bis-(m-methoxyphenyl) imidazolyl.

11. The composition of claim 9 wherein the aminotriphenylmethane is selected from the class consisting of

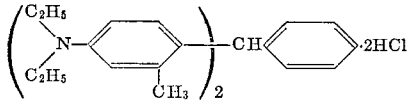

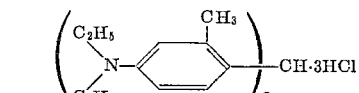

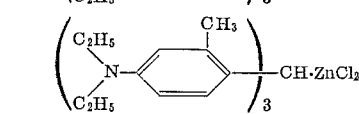

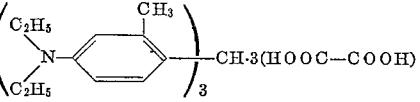

and

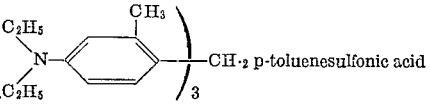

and wherein component (2) is selected from the class consisting of the dimer of 2-(o-chlorophenyl)-4,5-diphenyl imidazolyl,
2-(2,4-dichlorophenyl)-4,5-diphenyl imidazolyl,
2-(o-methoxyphenyl)-4,5-diphenyl imidazolyl,
2-(o-bromophenyl)-4,5-diphenyl imidazolyl,
2-(o-fluorophenyl)-4,5-diphenyl imidazolyl,
2-(2,3-dimethoxyphenyl)-4,5-diphenyl imidazolyl,
2-(o-methoxyphenyl)-4,5-bis(p-methoxy)phenyl imidazolyl.

12. The composition of claim 11 wherein the aminotriphenylmethane is

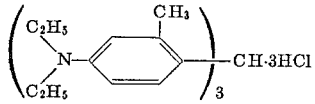

13. Process which comprises irradiating the composition of claim 9 with light having wavelengths in the range 2000A. to 4200A.

14. A coating composition comprising a composition of claim 9 in an inert solvent.

15. The coating composition of claim 14 which additionally contains a plasticizer.

16. The coating composition of claim 14 which additionally contains an inert transparent binder.

17. An article comprising an inert substrate coated with a composition of claim 14.

18. The coating composition of claim 17 which additionally contains an inert transparent binder.

19. The coated article of claim 17 wherein the substrate is paper.

20. The coated article of claim 19 wherein the substrate is a film.

References Cited

UNITED STATES PATENTS 3,242,122  3/1966  Cheng.

OTHER REFERENCES

T. Hayashi et al.: "A New Phototropic Substance and Its ESR." J. Chem. Phys., 32, 1568, May 1960. 96–90 PC.

NORMAN G. TORCHIN, *Primary Examiner.*

CAROLYN E. DAVIS, *Assistant Examiner.*